United States Patent [19]
Hilbert et al.

[11] Patent Number: 4,554,206
[45] Date of Patent: Nov. 19, 1985

[54] POLYESTER HOT-MELT ADHESIVES

[75] Inventors: Samuel D. Hilbert, Jonesborough; Richard L. McConnell, Kingsport, both of Tenn.

[73] Assignee: Eastman Kodak Company, Rochester, N.Y.

[21] Appl. No.: 717,933

[22] Filed: Mar. 29, 1985

[51] Int. Cl.⁴ .............................................. C08G 63/68
[52] U.S. Cl. .................................. 428/261; 428/198; 428/224; 428/284; 428/920; 528/299
[58] Field of Search ................ 528/299; 428/198, 224, 428/284, 920, 261

[56] References Cited

U.S. PATENT DOCUMENTS 4,085,091  4/1978  Frazer ................................. 528/299
4,180,652 12/1979  Nogami et al. ...................... 528/299
4,182,842  1/1980  Jackson et al. ..................... 528/299

Primary Examiner—James J. Bell
Attorney, Agent, or Firm—John F. Stevens; William P. Heath, Jr.

[57] ABSTRACT

Disclosed are low-melting thermoplastic copolyesters containing repeat units from a halogenated glycol or halogenated dibasic acid which are useful as hot-melt adhesives for applications in which reduced flammability is important.

8 Claims, No Drawings

POLYESTER HOT-MELT ADHESIVES

DESCRIPTION

1. Technical Field

This invention relates to low-melting thermoplastic copolyesters containing repeat units from a halogenated glycol or halogenated dibasic acid which are useful as hot melt adhesives for applications in which reduced flammability is important.

2. BACKGROUND OF THE INVENTION

In certain applications for hot-melt adhesives, it is desirable to have reduced flammability. For example, modern automotive upholstery fabrics consist of layers of fabric and foam cushioning. A hot-melt adhesive is frequently used to join the fabric to the foam. Upholstery laminates which burn erratically are unsatisfactory.

Polyester adhesives are well known in the art. It is also known in the art that the flammability of polymers can be reduced by introducing a halogenated additive into the polymer. It is not believed to be known in the art, however, to use a halogenated glycol or halogenated dibasic acid as a reactant in producing the polyester, so as to obtain a copolyester having the halogen as a part of the repeat units of the copolyester.

DESCRIPTION OF THE INVENTION

According to the present invention, there is provided a linear, thermoplastic crystalline copolyester adhesive having a melting point of about 60°–180° C., an I.V. of about 0.4–1.2, and a heat of fusion of less than 12 calories per gram. The copolyester has repeat units from (a) about 2–50 mol % of an alicyclic or aliphatic glycol having 2 to 12 carbon atoms and at least one halogen substituent, or (b) about 2–50 mol % of an aliphatic, alicyclic or aromatic dibasic acid having 4 to 12 carbon atoms and at least one halogen substituent, or (c) about 2–50 mol % of a combination of (a) and (b). The copolyester contains sufficient mol percent of at least one other aliphatic or alicyclic glycol having 2 to 12 carbon atoms to bring the total to 100 mol percent glycol and sufficient mol percent of at least one other aliphatic, alicyclic or aromatic acid having 4 to 12 carbon atoms to bring the total to 100 mol percent dibasic acid.

The halogenated compound must contain at least one and preferably greater than one halogen atom per monomer molecule. Chlorinated or brominated glycols and acids are preferred. About 8 halogen atoms per monomer molecule is the highest practical limit.

Typical examples of these compounds include 2,5-dichloroterephthalic acid, 2-bromoterephthalic acid, 2,2-bis(bromomethyl)-1,3-propanediol, 2,3-dibromosuccinic acid, 2-chloroterephthalic acid, tetrabromoterephthalic acid, bis(hydroxyethyl ether) of tetrabromobisphenol A, and the like.

The other dicarboxylic acid components of the polyester may consist of aliphatic dicarboxylic acids, alicyclic dicarboxylic acids, aromatic dicarboxylic acids, or mixtures of two or more of these diacids. Examples of such dicarboxylic acids include succinic, glutaric, adipic, azelaic, sebacic, 1,12-dodecanedioic, 1,4-cyclohexanedicarboxylic, 1,3-cyclohexanedicarboxylic, terephthalic, isophthalic, and the like.

The other glycol components of the polyester may consist of aliphatic and alicyclic diols and selected poly(ethylene glycols) or mixtures of two or more of these diols. Examples of such diols include diethylene glycol, triethylene glycol, ethylene glycol, propylene glycol, 1,3-propanediol, 1,4-butanediol, 1,5-pentanediol, 1,6-hexanediol, 1,3-cyclohexanedimethanol, 1,4-cyclohexanedimethanol, and the like.

The copolyesters are readily prepared using typical polycondensation techniques well known in the art. Typical polycondensation catalysts which may be used include titanium alkoxides, dibutyl tin dilaurate, and combinations of zinc, manganese, or magnesium acetates or benzoates with antimony oxides or antimony triacetate.

Useful polymers may have I.V. values ranging from about 0.4 to about 1.2 with preferred polymers having I.V. values ranging from about 0.5 to 1.1.

The polymers are also crystallizable and generally have heats of fusion ($\Delta H_f$) less than 12 calories/gram. The polymers generally have melting points measured by differential scanning calorimetry of 60° C. to 180° C.

The polymers of this invention are useful as adhesives for bonding automotive fabric/foam, carpeting, and headliner laminates as well as other applications where reduced flammability is desired. Of special interest is the reduced flammability properties of these polyester adhesives. The polyester adhesives give reduced flammability when compared to adhesives without the halogenated reactive acid or glycol modification.

The powdered adhesives may be readily applied to fabrics by conventional random sprinkling, powder point, or paste application methods. These powders may also be applied from electrostatic spray guns. The adhesives may also be utilized in film or melt blown web form and be heat reactivated at the time that laminates are made.

The following examples are submitted for a better understanding of the invention.

EXAMPLE 1

A typical polyester prepared in accordance with this invention is as follows: a total of 77.5 g (0.40 mol) of dimethyl terephthalate, 23.5 g (0.10 mol) 2,5-dichloroterephthalic acid, 85 g (0.72 mol) 1,6-hexanediol, 25 g (0.28 mol) 1,4-butanediol, and 0.425 mL of a n-butanol solution of acetyltriisopropyl titanate which contains 0.03 g Ti per mL is placed into a 500-mL, single-neck, round bottom flask equipped with a nitrogen inlet, stirrer, vacuum outlet, and a condensing flask. The flask is heated at 200° C. in a Belmont metal bath for 60 minutes and at 210° C. for 75 minutes with a nitrogen sweep over the reaction mixture. When the theoretical amount of methanol and water has distilled from the reaction mixture, the metal bath temperature is increased to 255° C. The flask is heated at 255° C. at a reduced pressure of 0.5 to 0.2 mm of mercury for 35 minutes. The flask is removed from the bath and is allowed to cool in a nitrogen atmosphere while the polyester crystallizes. The tan colored polyester has an inherent viscosity of 0.70, a crystalline melting point of 100° C. (second cycle DSC data), and a heat of fusion of 2.6 cal/g. Nuclear magnetic resonance analysis of the polymer shows that the polymer is composed of 81 mol % terephthalic acid, 19 mol % 2,5-dichloroterephthalic acid, 81 mol %, 1,6-hexanediol, and 19 mol % 1,4-butanediol. The polyester is ground in a hammermill in the presence of liquid nitrogen to a powder and is sieved to separate the fraction which passes through a 40 U.S. mesh screen. The polyester adhesive powder is applied by sprinkling to the foam of a seating laminate and is fused in an infrared heated oven. The face fabric is laminated to the adhesive-coated foam by heat-sealing under pressure in a continuous operation. The laminate is tested by the DOT (Department of Transportation) test method FR302. Burning rates of the samples tested are 2.0, 1.95, and 1.98 in./min. for three specimens. Similar bonds made with an adhesive (without halogenated compound) composed of 80 mol % terephthalic acid, 20 mol % isophthalic acid, 80 mol % 1,6-hexanediol, and 20 mol % 1,4-butanediol generally have burning rates in the range of 3.9 to 4.4 in./min.

T-peel fabric bonds on the composition are made as follows: films (5–8 mil thickness) of the polyester are prepared by compression molding at 160° C. using a Wabash hydraulic press. The films are cut into one-inch by four-inch pieces and bonds are made to four-inch by four-inch pieces of polyester cotton fabric using the Sentinel heat-sealer at four seconds dwell time, 15 psig jaw pressure, and bonding temperatures of 120° C., 135° C., and 150° C. The bonds are trimmed and cut into specimens (one inch by four inches) for testing purposes. T-peel strengths are reported as an average of three determinations per sample. The peel strength of the fabric bonds ranges from 18.2 to 25.7 lb/in. over the 120° C. to 150° C. bonding temperature range. Thus, the copolyester is an excellent adhesive for fabric.

EXAMPLE 2

Another polyester prepared in accordance with this invention is as follows: a total of 97 g (0.5 mol) of dimethyl terephthalate, 76.5 g (0.65 mol), 1,6-hexanediol, 26 g (0.1 mol) 2,2-bis(bromomethyl)-1,3-propanediol, and 0.46 mL of a n-butanol solution of acetyltriisopropyl titanate which contains 0.03 g Ti per mL is placed into a 500-mL, single-neck, round-bottom flask equipped with a nitrogen inlet, stirrer, vacuum outlet, and a condensing flask. The flask is heated at 200° C. in a Belmont metal bath for 60 minutes and at 210° C. for 75 minutes with a nitrogen sweep over the reaction mixture. When the theoretical amount of methanol has distilled from the reaction mixture, the metal bath temperature is increased to 255° C. The flask is heated at 255° C. at a reduced pressure of 0.5 to 0.2 mm of mercury for 56 minutes. The flask is removed from the bath and is allowed to cool in a nitrogen atmosphere while the polyester crystallizes. The tan colored polyester has an inherent viscosity of 0.81, a crystalline melting point of 129° C. (second cycle DSC data), and a heat of fusion of 7.7 cal/g. Nuclear magnetic resonance analysis of the polymer shows that the polymer is composed of 100 mol % terephthalic acid, 88 mol % 1,6-hexanediol, and 12 mol % of 2,2-bis(bromomethyl)-1,3-propanediol. The polyester is ground in a hammermill to a powder and is sieved to separate the fraction which passes through a 40 U.S. mesh screen. The polyester adhesive powder is applied by sprinkling to the foam of a seating laminate and is fused in an infrared heated oven. The face fabric is laminated to the adhesive-coated foam by heat-sealing under pressure in a continuous operation. The laminate is tested by the DOT test method FR302. Burning rates of the samples tested are 2.15, 2.22, and 2.30 in./min. for three specimens. Similar bonds made with an adhesive (without halogenated compound) composed of 100 mol % terephthalic acid, 80 mol % 1,6-hexanediol, and 20 mol % 1,4-butanediol generally have burning rates in the range of 3.85 to 4.50 in./min.

T-peel bonds on this composition are made as described in Example 1 except bond temperatures of 135°, 150°, and 165° C. are used. The peel strength of the fabric bonds range from 5.8 to 8.9 lb/in. over the 135° C. to 165° C. bonding temperature range.

EXAMPLE 3

The polyester described in Example 1 contains 81 mol % terephthalic acid, 19 mol % 2,5-dichloroterephthalic acid, 81 mol % 1,6-hexanediol, and 19 mol % 1,4-butanediol. This composition is ground in a hammermill to a powder and is sieved to separate the fraction which passes through a 40 U.S. mesh screen. The polyester adhesive powder is physically blended with 5 wt. % of powdered antimony oxide ($Sb_2O_3$). The blend is applied by sprinkling to the foam of a seating laminate and is fused in an infrared heated oven. The face fabric is laminated to the adhesive-coated foam by heat-sealing under pressure in a continuous operation. The laminate is tested by the DOT test method FR302. Burning rates of the samples are 1.52, 1.60, and 1.55 in./min. for three specimens. Similar burning rates are obtained when the antimony oxide is melt blended with the adhesive rather than physically blended.

Whenever the term "inherent viscosity" (I.V.) is used in this application, it will be understood to refer to viscosity determinations made at 25° C. using 0.50 gram of polymer per 100 ml. of a solvent composed of 60 wt. % phenol and 40 wt. % tetrachloroethane.

The "melting point" ($T_m$) of the polymers described in this application are readily obtained with a Differential Scanning Calorimeter.

The "heat of fusion" $\Delta H_f$ of polymers is the amount of heat absorbed when crystallizable polymers are melted. $\Delta H_f$ values are readily obtained using Differential Scanning Calorimeters (Perkin-Elmer). For example, one method for determining $\Delta H_f$ is described in *Journal of Applied Polymer Science* 20, 1209 (1976). Measurement of $\Delta H_f$ is also described in DuPont Thermal Analysis Bulletin No. 900-8 (1965). Qualitatively it is possible to compare the degree of crystallinity of polymers by comparing their $\Delta H_f$ values.

The strength of the bonds is determined by the so-called "Peel Test" based on a modification (i.e., three test specimens) of the ASTM "T-Peel Test" set forth on pages 63 and 64 of the 1964 edition of the BOOK OF ASTM STANDARDS, published by the American Society of Testing Materials, and more specifically identified as Test Number D-1876-61-T.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A linear, thermoplastic, crystalline copolyester adhesive, said copolyester adhesive having a melting point of about 60°–180° C., an I.V. of about 0.4–1.2, and a heat of fusion of less than 12 calories per gram, and said copolyester adhesive having repeat units from (a) an alicyclic or aliphatic glycol having 2 to 12 carbon atoms and at least one halogen substituent, (b) an aliphatic, alicyclic or aromatic dibasic acid having 4 to 12 carbon atoms and at least one halogen substituent, or (c) a combination of (a) and (b), wherein (a), (b) or (c) accounts for about 2–50 mole percent based on 100 mole percent glycol and 100 mole percent dibasic acid, said copolyester containing sufficient mole percent of at least one other aliphatic or alicyclic glycol having 2 to 12 carbon atoms to bring the total to 100 mole percent glycol and sufficient mole percent of at least one other aliphatic, alicyclic or aromatic acid having 4 to 12 carbon atoms to bring the total to 100 mole percent dibasic acid.

2. A copolyester according to claim 1 having repeat units from dichloroterephthalic acid.

3. A copolyester according to claim 1 having repeat units from terephthalic acid, 2,5-dichloroterephthalic acid, 1,6-hexandiol and 1,4-butanediol.

4. A copolyester according to claim 1 having repeat units from 2,2-bis(bromomethyl)-1,3-propanediol.

5. A copolyester according to claim 1 having repeat units from terephthalic acid, 1,6-hexanediol, and 2,2-bis(bromomethyl)-1,3-propanediol.

6. A copolyester according to claim 1 having repeat units from at least one of the group consisting of 2,5-dichloroterephthalic acid, 2-bromoterephthalic acid, 2,2-bis(bromomethyl)-1,3-propanediol, 2,3-dibromosuccinic acid, 2-chloroterephthalic acid, tetrabromoterephthalic acid, and bis(hydroxyethyl ether) of tetrabromobisphenol A.

7. A substrate having a coating comprising the copolyester of claim 1.

8. A fabric substrate and cushioning material laminated together by the copolyester adhesive of claim 1.

* * * * *